2,992,226
CERTAIN 2,5-BIS(FLUOROALKYL)1,3,4-OXA-DIAZOLES AND THIADIAZOLES

William J. Chambers, Claymont, Del., and Donald D. Coffman, West Chester, Pa., assignors to E. I. du Pont de Nemours and Company, Wilmington, Del., a corporation of Delaware
No Drawing. Filed Dec. 7, 1959, Ser. No. 857,519
9 Claims. (Cl. 260—302)

This invention relates to new fluorine-containing heterocyclic compounds. More particularly, it relates to new heterocyclic compounds in which the ring carbon atoms bear highly fluorinated substituents.

In spite of the continuously increasing technical importance of fluorinated organic compounds, only very few fluorine-containing heterocyclic structures are known. In particular, no compounds of the oxadiazole or thiadiazole type are known in which the ring carbon atoms bear highly fluorinated substituents, The new heterocyclic compounds made available by this invention are 1,3,4-oxadiazoles- and thiadiazoles in which each of the two carbon atoms in the 2- and 5-positions of the heterocyclic ring bears a perfluoroalkyl, ω-hydroperfluoroalkyl or ω-chloroperfluoroalkyl substituent.

These products are therefore represented by the formula

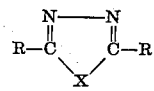

where X stands for a chalcogen of atomic number 8–16, i.e., oxygen or sulfur, and the R's represent perfluoroalkyl, ω-hydroperfluoroalkyl or ω-chloroperfluoroalkyl radicals, which may be the same or different.

The terms used above have their normal significance, i.e., perfluoroalkyl means an alkyl radical containing only carbon and fluorine atoms, and ω-hydroperfluoroalkyl or ω-chloroperfluoroalkyl means an alkyl radical containing only carbon and fluorine atoms and one hydrogen or chlorine atom, this hydrogen or chlorine atom being at the end of the chain.

The products of this invention are prepared by heating at a temperature of at least 200° C. a bis(fluoroacyl)-hydrazine of the formula R—CONHNHCO—R, where R is as defined above (i.e., perfluoroalkyl, ω-hydroperfluoroalkyl or ω-chloroperfluoroalkyl) with phosphorus pentoxide or phosphorus pentasulfide, whereby there is formed, as the case may be, a 1,3,4-oxadiazole or 1,3,4-thiadiazole having the substituent R attached to each of the two carbon atoms in the 2- and 5-positions in the heterocyclic ring. These reactions can be represented as follows:

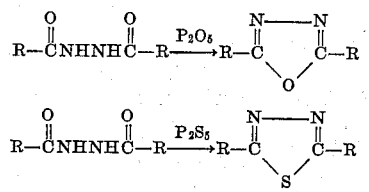

Instead of using the preformed and isolated bis(fluoroacyl)hydrazine, it is also possible to carry out the reaction by using a mixture of a fluorocarboxylic acid R—COOH, where R is as defined above, and hydrazine (or hydrazine hydrate) in approximately the proportions required to form the bis(fluoroacyl)-hydrazine. This mixture is heated, if desired in an inert organic medium such as benzene, until at least partial amidation has taken place as shown by elimination of water. The resulting product, which may be wholly the bis(fluoroacyl)hydrazine or a mixture thereof with the hydrazine salt of the fluorocarboxylic acid, can be reacted as such and without isolation and purification with phosphorus pentoxide or pentasulfide.

If it is preferred to prepare separately and isolate the bis(fluoroacyl)hydrazine, this can be done by reacting hydrazine or hydrazine hydrate with the chosen fluorocarboxylic acid, or, preferably, an amide-forming derivative thereof, e.g., the corresponding acid chloride or a suitable alkyl ester of the acid, and isolating the resulting bis(fluoroacyl)hydrazine.

The fluorocarboxylic acids which serve as starting materials for the products of this invention, either per se or as the corresponding bis(fluoroacyl)hydrazines, can be prepared by methods described in the journal or patent literature.

Specific examples of fluoromonocarboxylic acids suitable for reaction with hydrazine and subsequent conversion to the heterocyclic compounds of this invention, include trifluoroacetic acid, perfluoropropanoic acid, perfluorobutanoic acid, perfluoroisobutanoic acid, perfluoropentanoic acid, perfluorohexanoic acid, perfluorooctanoic acid (as the pure straight chain acid or as a commercially available mixture containing about 70% of the straight chain acid, the remainder being a mixture of the isomeric acids

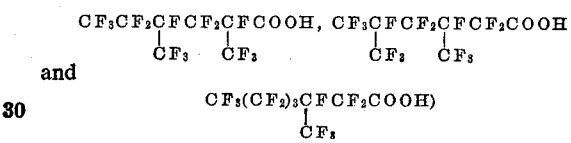

perfluorodecanoic acid, perfluorododecanoic acid, perfluorotetradecanoic acid, difluoroacetic acid, ω-hydroperfluoropropanoic acid, ω-hydroperfluoropentanoic acid, ω-hydroperfluoroheptanoic acid, ω-hydroperfluorononanoic acid, ω-hydroperfluoroundecanoic acid, ω-hydroperfluorotridecanoic acid, chlorodifluoroacetic acid, ω-chloroperfluorobutanoic acid, ω-chloroperfluorooctanoic acid, ω-chloroperfluorodecanoic acid, and the like. The most readily available of such acids are those having from 2–14 carbon atoms. Accordingly, the preferred bis(fluoroacyl)hydrazines for use in the process of the invention are those having the formula R—CONHNHCO—R, where R is as defined above and contains from 1–13 carbon atoms. The preferred products of the invention are similarly those in which the radical R in the cyclic formulas shown above has from 1–13 carbon atoms.

In the cyclization reaction between the bis(fluoroacyl)hydrazine and phosphorus pentoxide or phosphorus pentasulfide, it is desirable for best results to use the inorganic reactant in excess over the calculated amount. Thus, there is normally used at least one mole, and preferably from 2–10 moles, of $P_2O_5$ or $P_2S_5$ per mole of bis(fluoroacyl)hydrazine. A larger excess of the phosphorus reactant can be used but this is in general unnecessary.

The process is carried out simply by heating together a mixture of phosphorus pentoxide or phosphorus pentasulfide and of the bis(fluoroacyl)hydrazine or its precursor, i.e., the hydrazine salt of the fluorocarboxylic acid. No diluent is necessary, although if desired an anhydrous, inert organic liquid of high boiling point can be used.

A reaction temperature of at least about 200° C. is recommended since the cyclization reaction is impractically slow at lower temperatures. The temperature can be quite high, since the highly fluorinated 1,3,4-oxa- and -thiadiazoles of this invention have excellent heat stability, but in general it is unnecessary to exceed about 350° C., the preferred range of reaction temperature being that between 200–300° C.

The process is most conveniently carried out at atmospheric pressure in a vessel provided with a reflux condenser. After an appreciable amount of the desired heterocyclic compound has formed, as shown by the amount of material refluxing in the condenser, the reaction product is distilled out of the vessel under reduced or atmospheric pressure, and if desirable the remaining material is heated further until there is no longer substantial formation of distillable product. The reaction is in general essentially complete after heating for 0.5 hour to 4 hours at reaction temperature.

The products of this invention are liquids or relatively low melting solids, which can be distilled without decomposition. They can be readily purified by conventional fractionation methods, with or without previous washing with water or dilute alkali to remove any acidic impurities that may be present.

The following examples illustrate the invention in greater detail.

*Example I*

A mixture of 3 g. of bis($\omega$-hydroperfluorovaleryl)hydrazine, $H(CF_2)_4CONHNHCO(CF_2)_4H$, and 3 g. of phosphorus pentoxide was heated for 1 hour at 200–250° C. in a vessel provided with a reflux condenser. The reflux condenser was then removed, and the volatile material was distilled under reduced pressure. There was thus obtained 2.3 g. (79% conversion) of crude 2,5-bis($\omega$-hydroperfluorobutyl)-1,3,4-oxadiazole. This product was combined with that from a similar preparation, and the combined material was redistilled at atmospheric pressure. Pure 2,5-bis($\omega$-hydroperfluorobutyl)-1,3,4-oxadiazole,

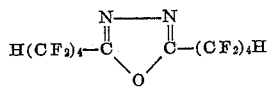

was obtained as a colorless liquid, B.P. 193–195° C. Its structure was confirmed by elemental, infrared and ultraviolet analysis.

*Analysis.*—Calc'd for $C_{10}H_2F_{16}ON_2$: F, 64.68; N, 5.95. Found: F, 65.14; N, 6.04.

The bis($\omega$-hydroperfluorovaleryl)hydrazine used as the starting material in this example was prepared as follows:

To a stirred solution of 38 g. (0.14 mole) of $\omega$-hydroperfluorovaleryl chloride in benzene was gradually added 7 g. (0.14 mole) of hydrazine hydrate. External cooling was applied during this addition to dissipate the heat of the spontaneous reaction. After addition of all the hydrazine hydrate, the cooling bath was removed and the mixture was stirred for 1.5 hours, after which additional benzene was added and the mixture heated to boiling while the water formed was removed by azeotropic distillation. The reaction mixture was then filtered while hot to remove the benzene-insoluble hydrazinium salt. On cooling the filtrate, there was obtained 22 g. of colorless, glistening crystals of 1,2-bis($\omega$-hydroperfluorovaleryl)hydrazine, $H(CF_2)_4CONHNHCO(CF_2)_4H$, M.P. 131–132° C. This product was identified by its infrared spectrum and by elemental analysis of a sample from a different preparation.

*Analysis.*—Calc'd for $C_{10}H_4F_{16}O_2N_2$: C, 24.59; H, 0.82; F, 62.29; N, 5.73. Found: C, 24.44; H, 1.31; F, 61.20; N, 6.19.

*Example II*

In this example, the starting material was the crude reaction product of $\omega$-hydroperfluorovaleric acid and hydrazine, rather than the preformed and isolated 1,2-bis-($\omega$-hydroperfluorovaleryl)hydrazine of Example I.

A mixture of 49.2 g. (0.2 mole) of $\omega$-hydroperfluorovaleric acid and 5 g. (0.1 mole) of hydrazine hydrate was refluxed in 200 ml. of benzene for 4 hours. The water formed during this period was removed by means of a water separator attached to the condenser. Most of the benzene was then removed by distillation at atmospheric pressure, and the white solid that formed was separated by filtration. There was thus obtained 25.6 g. of a solid (A), melting at 75–102° C. which was a mixture of the bis(fluoroacyl)hydrazine and of the hydrazine salt of $\omega$-hydroperfluorovaleric acid. A sample of this product, upon being shaken with water to extract the hydrazine salt and dried, had the melting point (131–132° C.) of bis($\omega$-hydroperfluorovaleryl)hydrazine. From the benzene filtrate initially obtained an additional 10 g. of crude bis(fluoroacyl)hydrazine (B) was isolated by further concentration.

A mixture of 14 g. of solid (A) and 14 g. of phosphorus pentoxide was heated for 2.5 hours at 300° C. under reflux and the volatile product (9 g., B.P. 170–196° C.) was separated by distillation. A mixture of 10 g. of solid (B) and 12 g. of phosphorus pentoxide was similarly treated and the volatile material (1.47 g.) was separated by distillation. The volatile reaction products were combined, washed with three 10 ml. portions of water and distilled from phosphorus pentoxide. There was obtained 6.3 g. of 2,5-bis($\omega$-hydroperfluorobutyl)-1,3,4-oxadiazole, B.P. 192–193° C.

*Example III*

A mixture of 5 g. of bis($\omega$-hydroperfluorovaleryl)-hydrazine and 5 g. of phosphorus pentasulfide was heated for 1 hour at 200–250° C. under reflux, after which the volatile material was removed by distillation under reduced pressure. The crude product was then redistilled at atmospheric pressure to give 3.6 g. (74% conversion) of 2,5-bis($\omega$-hydroperfluorobutyl)-1,3,4-thiadiazole,

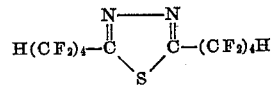

This product solidified on standing and had a melting point of 44.5–45.5° C. Its structure was confirmed by elemental, infrared and ultraviolet analysis.

*Analysis.*—Calc'd for $C_{10}H_2F_{16}N_2S$: N, 5.76; S, 6.58. Found: N, 5.67; S, 6.44.

*Example IV*

To 25 g. (0.5 mole) of hydrazine hydrate in 300 ml. of benzene was added with stirring 57 g. (0.5 mole) of trifluoroacetic acid. The mixture was refluxed for 1 hour, after which a water separator was attached and refluxing was continued for 2 hours while removing the water formed. An additional 57 g. (0.5 mole) of trifluoroacetic acid was then added and the mixture was refluxed 2 hours without removal of the water formed, then 15 hours with removal of the water. The solid reaction product that formed was separated by filtration, washed with 20 ml. of methylene chloride and dried in vacuum over phosphorus pentoxide. There was thus obtained 76 g. of a white solid (A) having no definite melting point. From the filtrate was obtained by removal of the solvent under reduced pressure 26 g. of a syrupy liquid (B).

Solid (A) was heated with 100 g. of phosphorus pentoxide for 2 hours at 200° C. under reflux, after which 100 ml. of 1,2,4-trichlorobenzene was added to improve contact between the reactants and the temperature was raised to 220° C. for 3 hours. The volatile reaction product was then removed by distillation. It consisted of 31.9 g. of a material boiling at 45–65° C.

The syrupy liquid (B) was heated with 100 g. of phosphorus pentoxide at 250° C. under reflux for 3 hours. Removal of the volatile reaction product by distillation gave 7 g. of material boiling at 45–65° C.

The volatile products from (A) and (B) were combined and distilled. The distillation indicated that the product was a mixture of trifluoroacetic anhydride, trifluoroacetic acid, and the oxadiazole. The product was therefore washed with 20 ml. of ice water, then with 20 ml. of 2% aqueous sodium hydroxide, dried over magnesium sulfate and redistilled at atmospheric pressure.

There was obtained 26.8 g. of a liquid boiling at 62.5–65° C. This was 2,5-bis(trifluoromethyl)-1,3,4-oxadiazole,

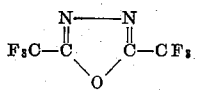

Infrared analysis supported the assigned structure.

Example V

A mixture of 4.2 g. of bis(perfluorobutyryl)-hydrazine and 4.3 g. of phosphorus pentoxide was heated at 200–250° C. under reflux for 2 hours, and the volatile reaction product was isolated by distillation at atmospheric pressure. There was obtained 2.8 g. (69% conversion) of a liquid boiling at 118–119° C., which was shown by elemental and infrared analysis to be 2,5-bis(perfluoropropyl)-1,3,4-oxadiazole,

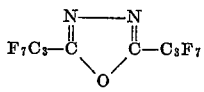

Analysis.—Calc'd for $C_8F_{14}ON_2$: N, 6.90; F, 65.52. Found: N, 7.74; F, 66.98.

The bis(perfluorobutyryl)hydrazine used in this example was prepared as follows:

To 29 g. (0.125 mole) of perfluorobutyryl chloride in 100 ml. of benzene was added gradually 6.3 g. (0.125 mole) of hydrazine hydrate, keeping the temperature at 10° C. The mixture was then refluxed for 2 hours while removing the water by means of a water separator attached to the condenser. After standing at room temperature overnight, the mixture was concentrated to a volume of about 40 ml. by evaporation under reduced pressure. There was obtained 15.6 g. of colorless crystals, M.P. 167–168° C., of 1,2-bis(perfluorobutyryl)hydrazine, $C_3F_7CONHNHCOC_3F_7$.

Example VI

A mixture of 4.5 g. of bis(perfluorooctanoyl)-hydrazine and 4 g. of phosphorus pentoxide was heated for 1 hour at 200–250° C. under reflux. Distillation of the volatile material at atmospheric pressure gave 3.3 g. (76% conversion) of crude reaction product, B.P. approximately 225° C. This product was combined with that of a similar preparation in which 23.5 g. of bis(perfluorooctanoyl)hydrazine was heated with 34 g. of phosphorus pentoxide at 300° C. for 2 hours. Redistillation of the combined products gave a liquid boiling at 234–236° C., which infrared analysis showed to be 2,5-bis(perfluoroheptyl)-1,3,4-oxadiazole,

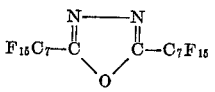

The bis(perfluorooctanoyl hydrazine used in this example was prepared as follows:

Perfluorooctanoyl chloride (37.5 g., 0.09 mole) and hydrazine hydrate (4.5 g., 0.09 mole) were reacted in 200 ml. of benzene by the procedure described in Example V. The reaction product was recrystallized from 1,2,2-trichloro-1,1,2-trifluoroethane to give 28 g. of 1,2-bis-(perfluorooctanoyl)hydrazine, $C_7F_{15}CONHNHCOC_7F_{15}$, M.P. 137–139° C. The infrared spectrum confirmed the identity of the compound.

The foregoing examples have illustrated the preparation of certain specific compounds of the class made available by this invention. Other examples of products which are obtained by following the described procedures include:

2,5-bis(trifluoromethyl)-1,3,4-thiadiazole
2,5-bis(perfluoroethyl)-1,3,4-thiadiazole
2,5-bis(perfluoroisopropyl)1,3,4-oxadiazole
2,5-bis(perfluorobutyl)-1,3,4-oxadiazole
2,5-bis(perfluoro-n-pentyl)-1,3,4-thiadiazole
2,5-bis(perfluoro-n-nonyl)-1,3,4-thiadiazole
2,5-bis(perfluoro-n-tridecyl)-1,3,4-oxadiazole
2,5-bis(difluoromethyl)-1,3,4-oxadiazole
2,5-bis(ω-hydroperfluoroethyl)-1,3,4-oxadiazole
2,5-bis(ω-hydroperfluoro-n-decyl)1,3,4-thiadiazole
2,5-bis(ω-hydroperfluoro-n-dodecyl)-1,3,4-oxadiazole
2,5-bis(ω-chloroperfluoropropyl)-1,3,4-thiadiazole
2,5-bis(ω-chloroperfluoro-n-heptyl)-1,3,4-oxadiazole
2,5-bis(ω-chloroperfluoro-n-nonyl)-1,3,4-oxadiazole The products of this invention are characterized by excellent heat stability, a property which makes them useful, as a class, as stable heat transfer media. The thermal stability of these products is shown by the fact that they are readily distillable at atmospheric pressure, and can even be heated for several hours at 350–400° C. without appreciable decomposition. It is more conclusively demonstrated by special tests in which a sample of the compound is placed in a stainless steel cylinder and heated to the test temperature, and the amount of undecomposed material present, as well as of other products which may have formed, is determined by mass spectrometry. These tests show that the products of this invention suffer but little decomposition in the range of 300–400° C. and remain to a large extent intact at temperatures as high as 500° C. Those products which are normally liquid are further useful as compressible fluids, for example, in hydraulic spring fluid compositions.

The fluorinated 1,3,4-oxadiazoles and thiadiazoles of this invention are further useful as solvents for highly fluorinated polymers. The solutions so obtained can be used to impregnate porous materials such as textiles, paper, wood, brick, and the like to give advantageous effects such as waterproofing, and to coat non-porous materials such as metals to give protective coatings. For example, a solution was prepared of low-melting tetrafluoroethylene polymer (M.P. 83–150° C.) in 2,5-bis(trifluoromethyl)-1,2,4-oxadiazole, and a strip of filter paper was immersed in the warm solution for a short time. The strip was dried in air and then exposed to a stream of water. The area of the strip which had been immersed in the polymer solution shed water completely and did not become wet, whereas the untreated portion of the paper became wet and soggy, demonstrating the waterproofing effect obtained by impregnation with the polymer. Similar solutions are formed with other liquid or low-melting fluorinated 1,3,4-oxadiazoles and thiadiazoles. On cooling to room temperature, these solutions form thick, paste-like gels. Reversible gels of this kind are useful for making tight, chemically inert seals on threaded joints, valves, couplings, fittings and similar metallic parts.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound of the formula

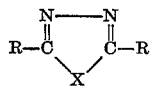

wherein X is a chalcogen of atomic number 8–16 and the R's are of 1–13 carbons and members of the class consisting of perfluoroalkyl, ω-hydroperfluoroalkyl and ω-chloroperfluoroalkyl radicals.

2. Process which comprises heating a mixture of a fluorocarboxylic acid of the formula

R—COOH wherein R is of 1–13 carbons and a member of the class consisting of perfluoroalkyl, ω-hydroperfluoroalkyl, and ω-chloroperfluoroalkyl radicals, and a member of the class consisting of hydrazine and hydrazine hydrate, and reacting the resulting product comprising a bis(fluoroacyl)hydrazine with a phosphorus-containing compound selected from the class consisting of phosphorus pentoxide and phosphorus pentasulfide.

3. Process which comprises heating at a temperature of at least 200° C. a bis(fluoroacyl)-hydrazine of the formula

R—CONHNHCO—R wherein the R's are of 1–13 carbons and members of the class consisting of perfluoroalkyl, ω-hydroperfluoroalkyl and ω-chloroperfluoroalkyl radicals, with a phosphorus-containing compound selected from the class consisting of phosphorus pentoxide and phosphorus pentasulfide.

4. Process as set forth in claim 3 in which the molar ratio of phosphorus-containing compound to the bis(fluoroacyl)hydrazine is from 2:1 to 10:1.

5. 2,5-bis(ω-hydroperfluorobutyl)-1,3,4-oxadiazole.
6. 2,5-bis(ω-hydroperfluorobutyl)-1,3,4-thiadiazole.
7. 2,5-bis(trifluoromethyl)-1,3,4-oxadiazole.
8. 2,5-bis(perfluoropropyl)-1,3,4-oxadiazole.
9. 2,5-bis(perfluoroheptyl)-1,3,4-oxadiazole.

References Cited in the file of this patent

FOREIGN PATENTS 1,067,439   Germany _____ Oct. 22, 1959